(12) United States Patent
Ledet

(10) Patent No.: US 10,592,695 B1
(45) Date of Patent: Mar. 17, 2020

(54) STAGGERED SECURE DATA RECEIPT

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 225 days.

(21) Appl. No.: 15/616,330

(22) Filed: Jun. 7, 2017

Related U.S. Application Data

(60) Provisional application No. 62/347,131, filed on Jun. 8, 2016.

(51) Int. Cl.
*H04L 29/06* (2006.01)
*G06F 21/62* (2013.01)
*G06F 21/78* (2013.01)

(52) U.S. Cl.
CPC ...... *G06F 21/6263* (2013.01); *G06F 21/6245* (2013.01); *G06F 21/78* (2013.01)

(58) Field of Classification Search
CPC combination set(s) only.
See application file for complete search history.

(56) References Cited

U.S. PATENT DOCUMENTS

| | | | |
|---|---|---|---|
| 5,960,080 A | 9/1999 | Fahlman et al. | |
| 7,193,972 B1 * | 3/2007 | Nakamura | H04L 47/10 370/229 |
| 7,386,621 B1 * | 6/2008 | Hlasny | H04L 12/1868 370/471 |
| 7,729,349 B2 * | 6/2010 | Beckmann | H04W 72/005 370/328 |
| 7,987,511 B2 | 7/2011 | Kitchener et al. | |
| 8,195,939 B2 | 6/2012 | Germersheim et al. | |
| 8,368,916 B2 * | 2/2013 | Mizuno | H04N 1/448 358/1.1 |
| 8,510,398 B2 | 8/2013 | Yasrebi et al. | |
| 9,130,986 B2 * | 9/2015 | Troyansky | G06F 21/552 |
| 2002/0026487 A1 | 2/2002 | Ogilvie et al. | |
| 2002/0178365 A1 | 11/2002 | Yamaguchi | |
| 2003/0163529 A1 * | 8/2003 | Yamaguchi | H04L 51/066 709/206 |
| 2004/0078596 A1 | 4/2004 | Kent et al. | |
| 2005/0262340 A1 * | 11/2005 | Rabb | H04K 1/00 713/165 |
| 2005/0278620 A1 | 12/2005 | Baldwin et al. | |
| 2006/0005020 A1 * | 1/2006 | Hardt | H04L 63/105 713/166 |
| 2006/0075228 A1 | 4/2006 | Black et al. | |
| 2007/0005713 A1 * | 1/2007 | LeVasseur | H04L 63/126 709/206 |
| 2007/0104007 A1 * | 5/2007 | Mizuno | H04N 1/448 365/221 |
| 2010/0138658 A1 | 6/2010 | Logue et al. | |
| 2010/0223338 A1 * | 9/2010 | Hodes | G06Q 10/107 709/206 |

(Continued)

*Primary Examiner* — Malcolm Cribbs

(57) ABSTRACT

Message and data sharing may require additional levels of security beyond mere access authorization procedures. One example method of operation may include identifying data content associated with a data file, splitting the data content into data content sections, identifying potential recipient devices, and transmitting the data content sections to the potential recipient devices.

20 Claims, 10 Drawing Sheets

(56) References Cited

U.S. PATENT DOCUMENTS

| | | | |
|---|---|---|---|
| 2010/0242081 A1* | 9/2010 | Dunn | H04N 21/4347 725/126 |
| 2010/0250995 A1* | 9/2010 | Savitzky | H04L 9/0841 713/401 |
| 2010/0275021 A1 | 10/2010 | Kristiansen et al. | |
| 2011/0113109 A1 | 5/2011 | LeVasseur et al. | |
| 2013/0036478 A1 | 2/2013 | Davis et al. | |
| 2013/0268357 A1 | 10/2013 | Heath | |
| 2013/0333018 A1 | 12/2013 | Doukhvalov et al. | |
| 2014/0201527 A1 | 7/2014 | Krivorot | |
| 2014/0208445 A1 | 7/2014 | DeLuca et al. | |
| 2014/0280261 A1 | 9/2014 | Butler et al. | |
| 2014/0314232 A1 | 10/2014 | Fahrny | |
| 2015/0082391 A1 | 3/2015 | Lerman et al. | |
| 2015/0091917 A1* | 4/2015 | Li | G06F 3/1446 345/520 |
| 2015/0150091 A1 | 5/2015 | Bruce et al. | |
| 2015/0205975 A1 | 7/2015 | Agrawal et al. | |
| 2015/0324593 A1* | 11/2015 | Abuelsaad | H04W 12/02 713/152 |
| 2015/0381567 A1 | 12/2015 | Rajcan et al. | |
| 2016/0119134 A1* | 4/2016 | Hakoda | G06F 21/6245 713/171 |
| 2016/0142501 A1 | 5/2016 | Herger et al. | |
| 2016/0241530 A1 | 8/2016 | Andreev et al. | |
| 2017/0185344 A1* | 6/2017 | Kirshenbaum | G06F 12/1458 |

* cited by examiner

STAGGERED SECURE DATA RECEIPT

CROSS-REFERENCE TO RELATED APPLICATIONS

This application claims priority to earlier filed U.S. provisional patent application No. 62/347,131, entitled "DATA CREATION DELIVERY AND RECEIPT", filed on Jun. 8, 2016, the entire contents of which are hereby incorporated by reference.

TECHNICAL FIELD OF THE APPLICATION

This application relates to sensitive data sharing and more particularly to determining data sensitivity whether certain parties should receive some or none of the sensitive data.

BACKGROUND OF THE APPLICATION

Conventional data sharing procedures utilize little or no authorization when determining whether to share data with potentially unsecure devices. Once data is considered to be sensitive in nature, the recipients of such data should be identified as secure prior to sharing the sensitive data. Also, the devices to which the sensitive data is to be sent may be identified and categorized according to a relative safety standard.

SUMMARY OF THE APPLICATION

One example embodiment may provide a method that includes at least one of identifying message content associated with a message, splitting the message content into a plurality of message content sections, identifying a plurality of potential recipient devices, and transmitting the plurality of message content sections to the plurality of potential recipient devices.

Another example embodiment may include an apparatus that includes a processor configured to identify message content associated with a message, split the message content into a plurality of message content sections, identify a plurality of potential recipient devices, and a transmitter configured to transmit the plurality of message content sections to the plurality of potential recipient devices.

Another example embodiment may include a non-transitory computer readable storage medium configured to store instructions that when executed cause a processor to perform identifying message content associated with a message, splitting the message content into a plurality of message content sections, identifying a plurality of potential recipient devices, and transmitting the plurality of message content sections to the plurality of potential recipient devices.

Another example embodiment may include a method that includes identifying data content associated with a data file, splitting the data content into a plurality of data content sections, identifying a plurality of potential recipient devices, and transmitting the plurality of data content sections to the plurality of potential recipient devices.

Still another example embodiment may include an apparatus that includes a processor configured to identify data content associated with a data file, split the data content into a plurality of data content sections, identify a plurality of potential recipient devices, and a transmitter configured to transmit the plurality of data content sections to the plurality of potential recipient devices.

Yet still another example embodiment may include a non-transitory computer readable storage medium configured to store instructions that when executed cause a processor to perform identifying data content associated with a data file, splitting the data content into a plurality of data content sections, identifying a plurality of potential recipient devices, and transmitting the plurality of data content sections to the plurality of potential recipient devices.

DETAILED DESCRIPTION OF THE APPLICATION

Figure 1:
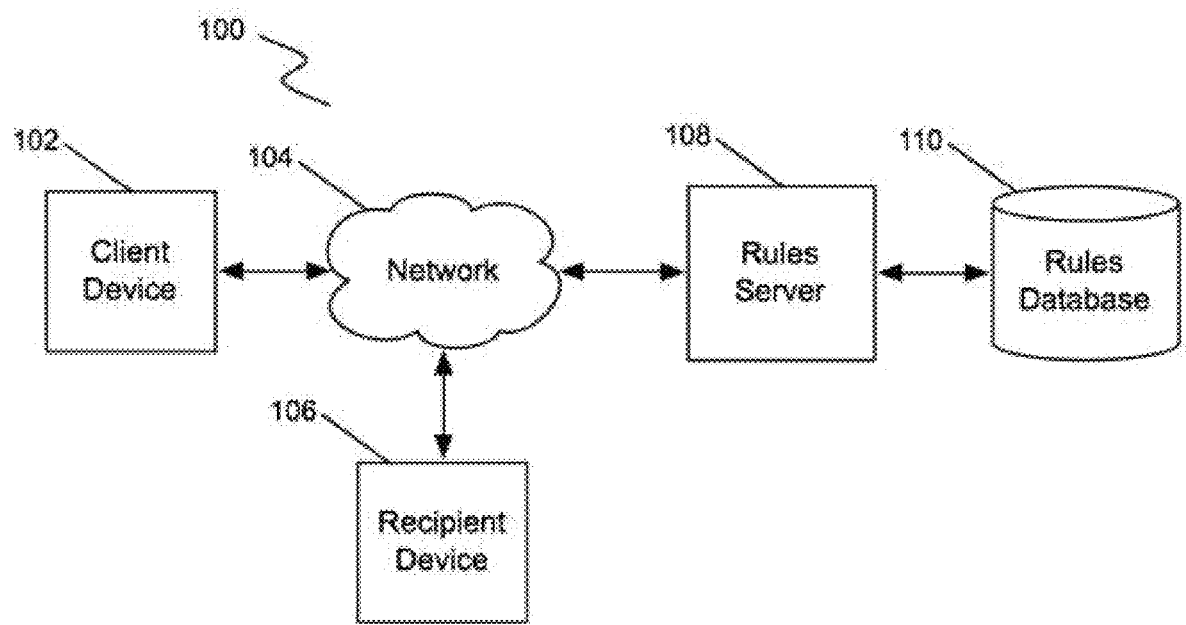
FIG. 1 illustrates a network system diagram according to an example embodiment of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide procedures for sharing sensitive data with devices that are considered secure in nature, and not providing sensitive data to devices that are determined to be unsecure or not-secure, for example, on a public network. In one example, a request is made from an unsecure, personal device to a secure server. A response is received at the unsecure, personal device with only non-secure data. A secure connection is made between the secure server and a secure device/account, such as a work-related device/account, and, as a result, data may then be authorized to be sent to the secure personal device. For example, the status of a personal topic may be requested, such as the status of a buyout offer currently being made by one corporation for another corporation. This request is sent to and received by a secure server. The secure server performs various actions, such as sends back an unsecure message to the user, responding to the user's question without providing any secure data. The secure sever also establishes a secure connection between the secure server and a secure device/account, and sends the entire response, including secure data, to the user's secure device/account. Throughout the disclosure, the word 'user' may refer to a user, a user client device(s), a user device(s), a user profile, and/or any device containing a memory and processor interacted with in some manner by the user.

FIG. 1 is a system diagram 100 of the present application according to example embodiments. The present application, which may be in the form of software, for example, permits a user to utilize a client device 102, such as a tablet computer, a laptop or desktop computer to access and operate the application software. The software may be included in the default client device or may be downloaded from a remote source, for example the network 104. A client's device may also be a gaming system, a DVD player, or any other device that contains a processor and memory. The present application in the form of software, for example may reside on the client's device 102 that may be any of a mobile laptop device and/or a personal desktop computer or a mobile device including a smartphone. The computing device may be connected to the network 104, which may be the Internet or any other type of network through wired or wireless communication. It should be noted that other types of devices, in addition to devices 102, might be used with the present application, for example, a PDA, a MP3 player or any other wireless device, a gaming device, such as a hand held system or home based system, and the like, including a P.C. or other wired device, that can transmit and receive information may be used with the present application.

In operation, the user of the application may interface with the client device 102 and connect through the network 104 to a rules server 108. The rules server 108 may be redundant, or may be more than a single entity without deviating from the scope of the application. A rules database 110 may be directly connected to the rules server or connected remotely through the network without deviating from the scope of the application.

The application of the current application resides either completely or partially on the client device 102, which may be a mobile device, but may also reside on a user's desktop computer, a personal digital assistant (PDA), tablet computer, or any other device containing a processor, memory, and functional software such as an operating system. In addition, the application of the current application may reside either completely or partially on any one of the other elements in the system depicted in FIG. 1, for example, the network 104.

If the application of the current application resides on a client device 102, the application of the current application is downloaded through a platform, such as an application store or market site residing on the device or accessed via the device, or accessed through the device's browser communicably coupled to the network 104. Further, the application of the current application may be pre-loaded on the device or automatically loaded based on the location of the device, attributes of the user and/or of the device and the like. The current application may work with any device such as a personal computer, a laptop, a personal computing tablet, a smartphone, a PDA, a watch, eyewear/glasses or any device with a processor and memory.

A separate device, the recipient device 106, which may be a plurality of recipient devices, is connected either via wired or wirelessly to the network 104 and may communicate with the client device 102 via the network 104. This entity may receive an originating message from the client device 102 such that a message originating at the client device is routed to the recipient device.

Figure 2:
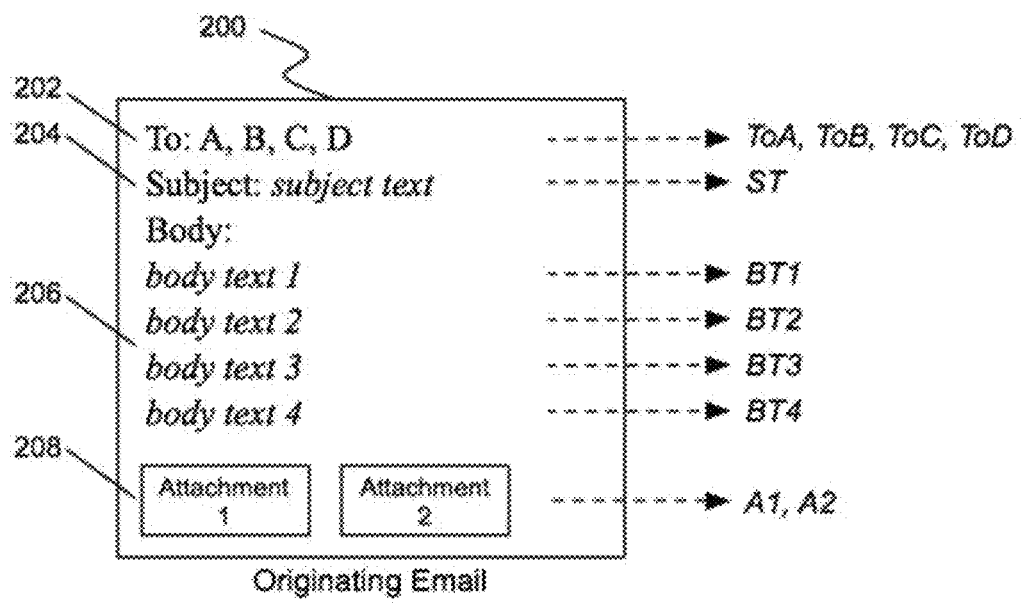
FIG. 2 illustrates a secure message format configuration according to an example embodiment of the present application.

FIG. 2 illustrates an example of an email that is originated by the user of a client device 102 via an email application according to example embodiments. The particular elements of the originating email are discussed at a granular level to assist in understanding how portions of the email are processed. In general, there are four portions of an email including but not limited to a list of recipients 202, a subject of the message 204, a text or body of the message 206, and any attachments added to the message 208. The message may contain all elements listed above, but must contain at least one element, which is the recipient 202. The other elements aside from the recipient are optional.

For purposes of example depicted in FIG. 2, each of the elements in the originating message are broken-out and given a particular variable name. The following describes the email elements: ToA, ToB, ToC, ToD represent up to four different recipients, or the To: portion, of the email such that the recipients are identified by A, B, C and D. ST is the subject text of the email. BT1, BT2, BT3 and BT4 are the four portions of the body of the text. It is noted that there may be fewer or more than four portions of body text, but four elements should suffice for purposes of this example. Also, A1 and A2 are the attachments of the email. It is also noted that there may be fewer or more than two attachments, including no attachments. The current application may deliver parts of the data of an email to different devices associated with the different recipients, considering the secure nature of the recipients.

The data being sent may be any of the following types and formats including but not limited to: email, text, social media message, photo, video, etc. Considerations for determining whether to deliver the data to a recipient include the current location of the recipient, if unsecure, the number and type of device(s), and the connection of the device (wired or wireless) in terms of security. The application may determine to send more sensitive data to a wired device, less sensitive data to a wireless device, and most sensitive data to neither. For example, in the scenario of sending an email, the parts of the email are divided into categories, when the secure nature of each part is considered. Elements of the email may be considered more secure in nature than others. For example, the entire body, or parts of the body of the message, may be determined to be higher security than, perhaps, the subject of the email. Also, one or more attachments may also be considered secure in nature.

Figure 3:
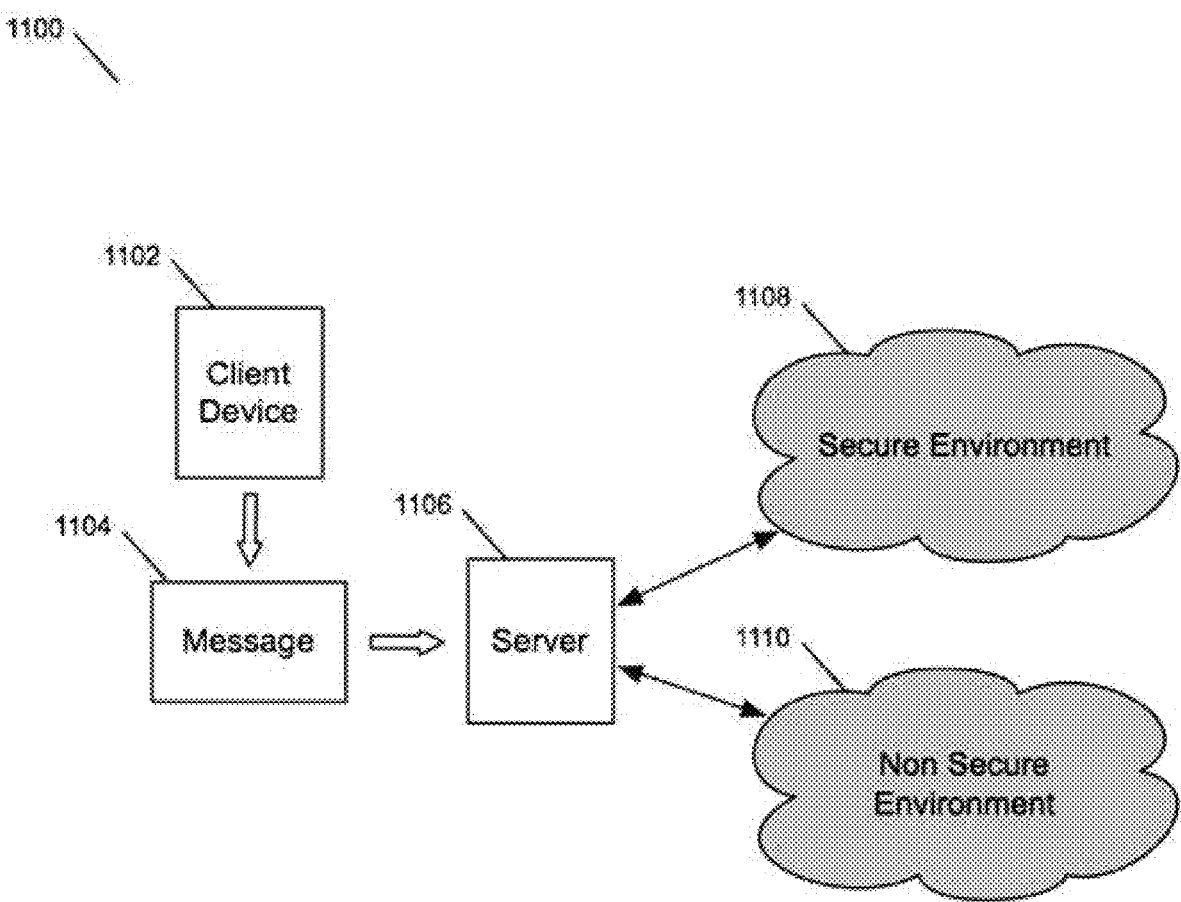
FIG. 3 illustrates a system logic data flow of information according to an example embodiment of the present application.

FIG. 3 illustrates a communication environment 1100 containing secure and non-secure environments and the interactions between them and a server according to example embodiments. In this example, the client device 1102 is the device originating the data, or in this case, the message 1104. The message is sent to a server 1106 for processing. The server may be a remote server such that communication between the client device and the server is through a network 104. Instead, the server may be coupled to the client device in another manner without deviating from the scope of the current application.

In operation, there are two environments that are connected to the server 1106, a secure environment 1108, and a non-secure environment 1110. The secure environment 1108 may be an environment, such as a network associated with an organization, an environment where devices within that network are part of a virtual private network (VPN), a small network such as a WIFI network, or any similar organization. The non-secure environment is an environment where devices within that network are part of the general Internet and devices are not considered secure in nature. Devices within this network may be connected through the network via cellular connections, such as non-WIFI networks or part of a network within an organization.

In another example, there is a non-secure area within the secure environment 1108 (not depicted). This may be a part of the network that the WIFI is unable to reach, or a room, or otherwise, a purposeful area such that the network is unable to extend. There is also a situation where a secure area is located within the non-secure environment 1110, for example, an area where a network is established within a defined area. For example, a specific element on the device, such as a SIM card, may be activated to permit for a secure communication only when inside a particular location inside a non-secure environment.

Figure 4:
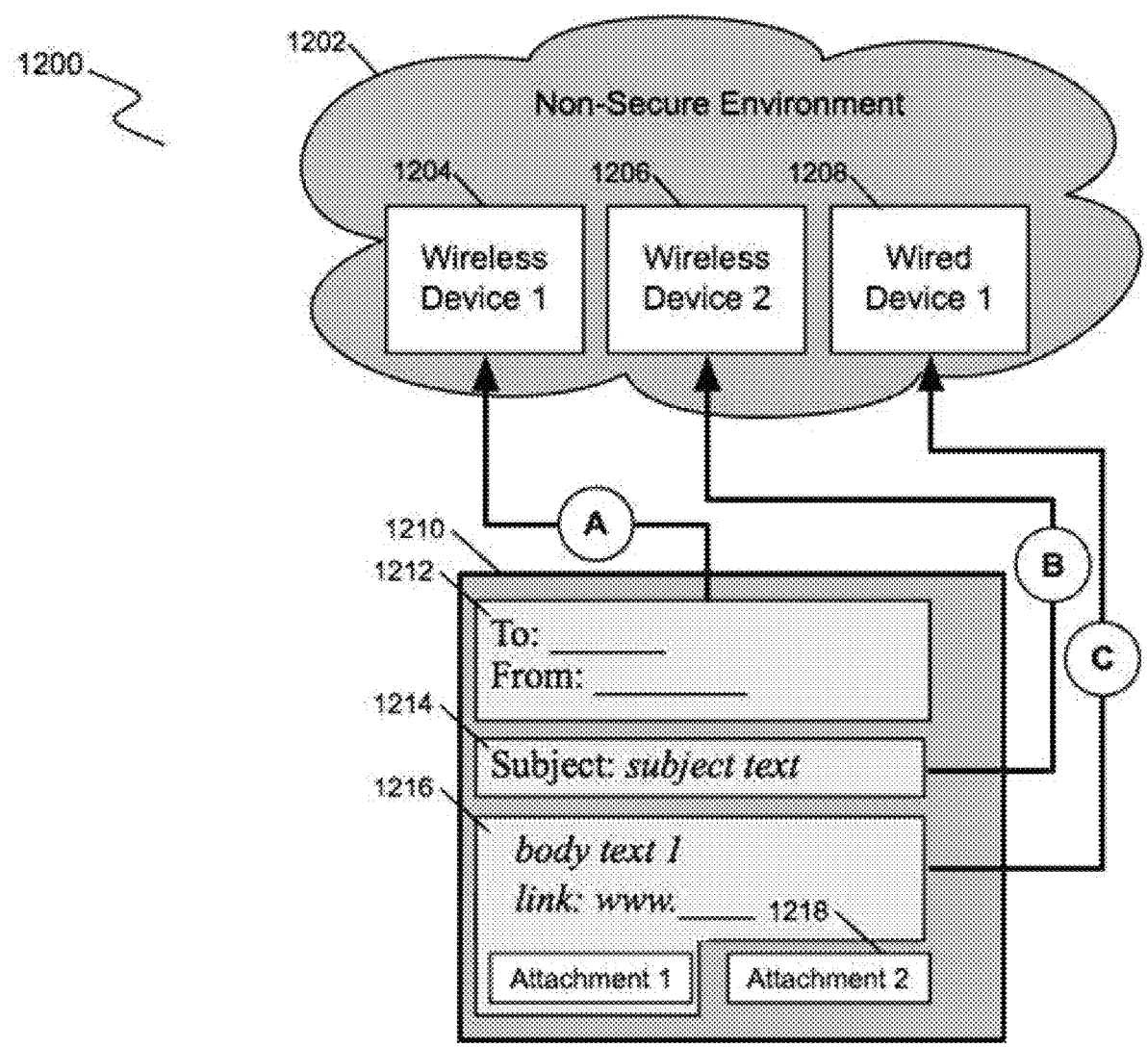
FIG. 4 illustrates a message flow for sharing data with various devices in a non-secure environment according to an example embodiment of the present application.

FIG. 4 illustrates a splitting of data in a message as one implementation of the current application 1200. A message 1210 is presented containing different elements making up the message including a recipient 1212, a subject line 1214, a body of the message 1216, and an attachment 1218. The message 1210 is an email message, but one versed in computer programming and design will easily determine that the functionality presented in the current application may apply to other types of messages and data without deviating from the scope of the application. Furthermore, message 1210 may be stored in a server/database (not shown) and or anything with a processor and memory and can be in a separate network, part of the non-secure environment, and may communicate with one or more of the devices via a wired and/or wireless connection. Such communication including messages A, B, and/or C can occur from the server or database (not shown) directly to the devices 1204-1208 in the network 1202, as depicted, or via one or more other components, such as a server, computer, or any device having a processor and memory and/or one or more other networks wired and/or wireless. A server, for example server 1106, may be present between the non-secure environment 1202 and the message 1210 (not depicted). A first part of the message "A" may be the heading 1212, which contains the proposed recipients and the originator of the message. Other elements may be included in this message part as well, for example, 'CC' and 'BCC' where 'CC' is for recipients that are copied on the current message, and 'BCC' are recipients that are blind copied, or copied, without the other recipients' knowledge.

A second part of the message "B" is the message subject 1214 which contains the overall single sentence topic of the message. A third part of the message "C" is the body of the message 1216 which contains data that includes the main part of the message. This part of the message may contain multiple types of data, including text, images, videos, links, etc. A final part of the message "D" are the attachments 1218 which may be singular or plural. Attached data may include multiple types of formats. The parts of the message are categorized according to how sensitive the data is identified to be inside the message. This characterization may be determined for all messages, such that the sensitivity of each part of the message is determined based on the specific part of the message, and/or the server 108 may parse the message and determine the sensitivity based on message content.

Certain ways to identify sensitivity may include the parsing of the individual parts of the message such that keywords and/or phrases are determined by the use of natural language processing (NLP). The analysis of the keywords/phrases in the data may help determine the sensitivity by comparing the keywords/phrases to a list of keywords/phrases associated with recipients of the messages, which are stored in the current application. The list of keywords/phrases may help determine whether a given recipient should or should not receive the data in the message.

In one example, a combination of factors used to identify message sensitivity may include both the preconfigured sensitivity in each part of the message as configured by the configuration module of the current application and the analysis of the individual parts of the message such as via NLP analysis where the current application processes the text to determine keywords/phrases which may then be used to compare against a list of keywords/phrases stored in the current application which may be keywords/phrases that are allowed or withheld per user or recipient of said message.

In one example, the user of the current application may input the sensitivity of the parts of the message in a configuration area of the current application. This configuration area is navigated via the menu GUI component of the current application permitting the user to specify aspects and actions of the application. For example, the application may provide input to determine the sensitivity of data in an outgoing message. The configuration elements display the parts of the message and the user may enter a number, for example, between '0' and '5', where 0 is the least sensitive and 5 is the most sensitive. The application then obtains the sensitivity number entered into the configuration element(s) to determine how to handle that part of the data in the outgoing message.

In another example, the application parses the data in an outgoing message permitting for the analysis of the words/phrases in the message. The application may then automatically assign sensitivity numbers based on the analysis of the words/phrases in the outgoing message. In FIG. 4, splitting data in the message may provide the first area of the message 1212, including the recipients and the originator of the message, being sent to wireless device 1 1204, which is a wireless device associated with the recipient in a non-secure environment 1202. This part of the message is signified as "A". This first part of the message is considered non-secure in nature. The second portion of the message, the subject text of the message 1214 is sent to wireless device 2 1206, which is a second device associated with the same recipient in a non-secure environment 1202. This part of the message is signified as "B". This second part of the message is considered more secure than the first part 1212. The third portion of the message, the body and the first attachment 1216, is sent to a wired device 1 1208, which is a wired device associated with the same recipient in a non-secure environment 1202. This part of the message is signified as "C". The Third part of the message is considered more secure in nature than the second part 1214, thus the need to send this portion to a more secure device, or in this case, a wired device. A final portion of the message, attachment 2 1218 is considered the most sensitive and is not delivered but stored in the server 1106. This portion of the message is signified as "D" (not shown).

The recipient may make changes to the data in the non-secure environment by altering the received data, then sending the data back to the server. For example, the "To" and "From" data 1212, sent to wired device 1 1204, which is sent to the recipient in the non-secure environment, may be altered. As a result, this permits the recipient to add/delete/modify the recipient(s) of the message.

Figure 5:
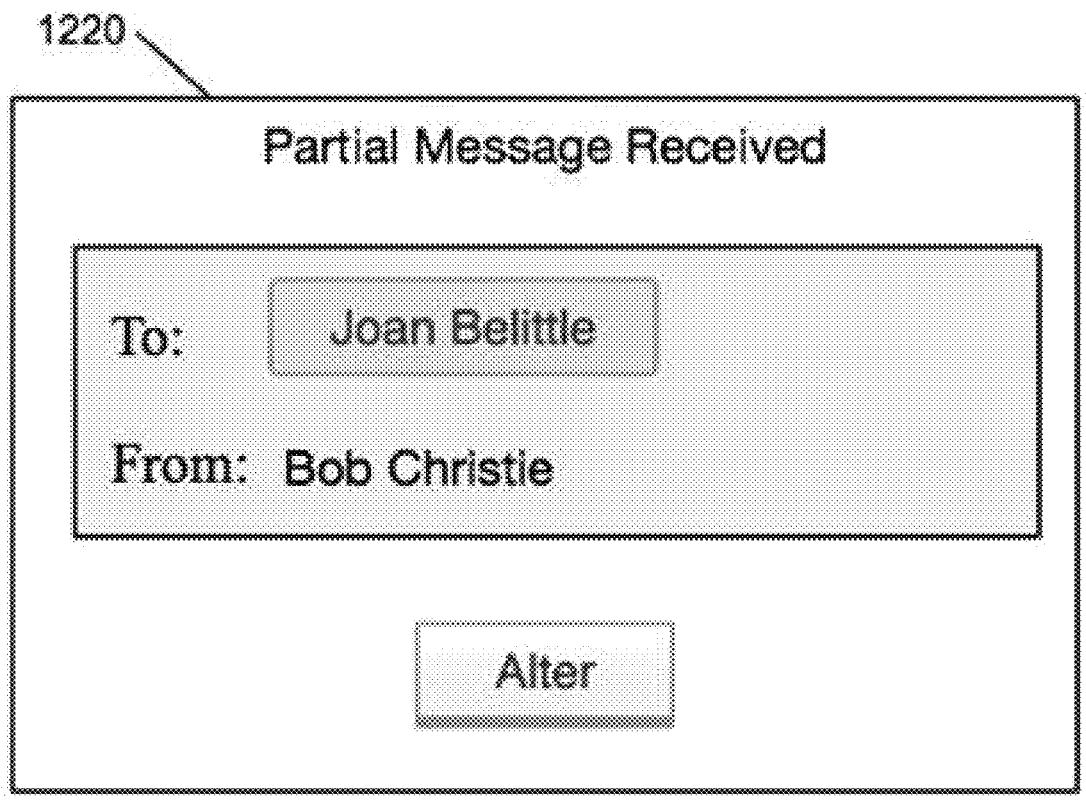
FIG. 5 illustrates a partial message interface according to an example embodiment of the present application.

FIG. 5 is one implementation of the current application illustrating a notification sent to a recipient 1220. This notification's title "Partial Message Received" informs the recipient that this is not an entire message and other parts of the message may be delivered to other devices associated with that recipient. In the notification, the recipient of the message and the originator of the message are presented. There may be a button entitled "Alter" which permits the user to alter the recipients of the message. When selected, there are GUI components presented that permit the user to type and/or select other recipients of the message (not depicted). This permits the user to send the message to other recipients not originally input by the originator of the message. The user is able to submit the modified data via a button, for example, "Submit", that sends the modified data to a server for further processing. In another example, the user may select the recipient name so the application displays GUI components permitting the user to modify the recipient(s).

Figure 6:
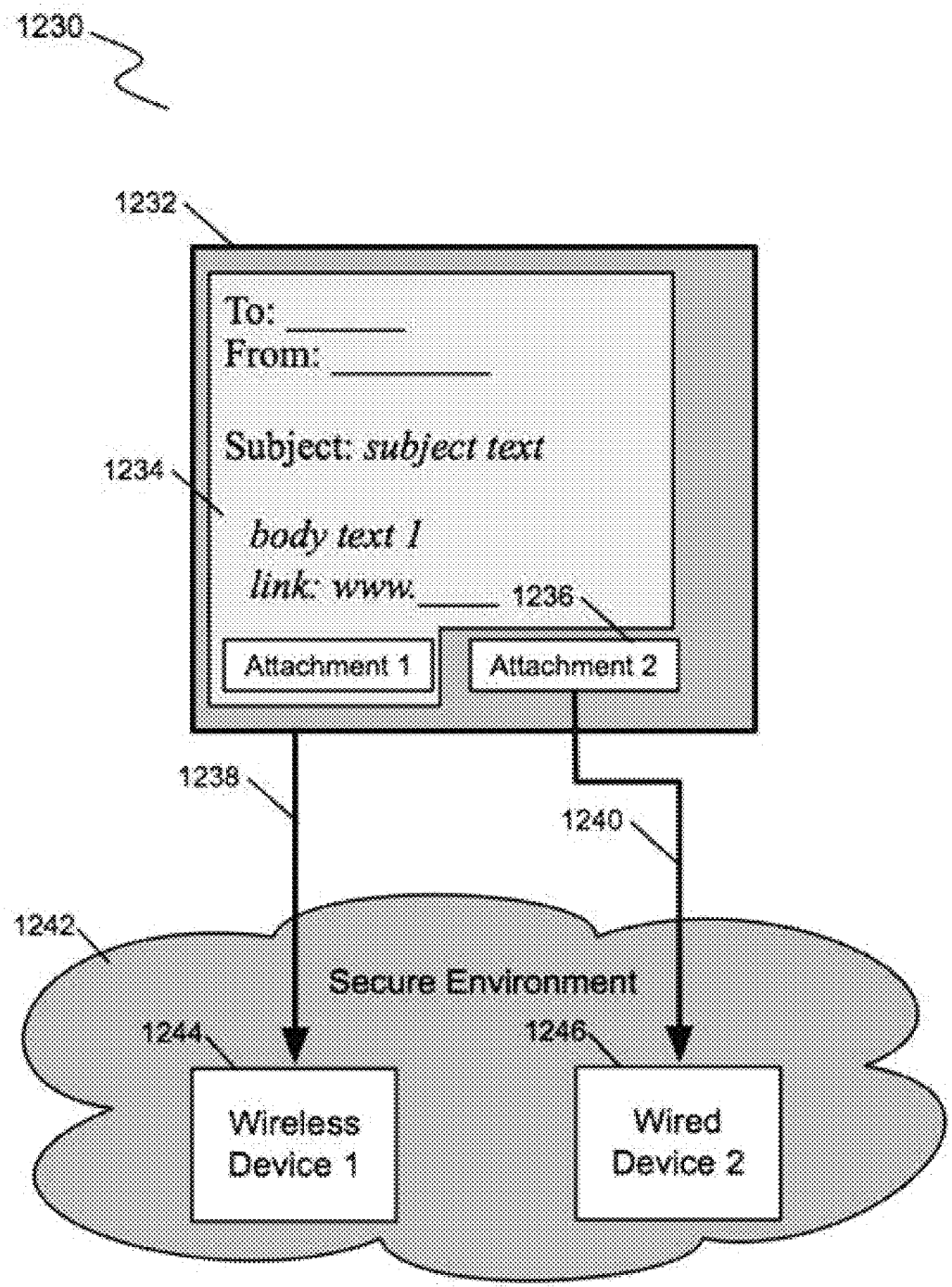
FIG. 6 illustrates an example of sending data to a secure environment according to an example embodiment of the present application.

In an example of sending data to a secure environment, FIG. 6 illustrates one implementation of the current application where data, in this example a message, is sent to a secure environment 1230. A server, for example server 1106, may be present between the secure environment 1242 and the message 1232. A message 1232 may contain multiple sections including the heading, subject, body, and an attachment 1234, and a second attachment 1236. In this example, a recipient of the message may have two known user devices including a wireless device 1 1244 and a wired device 2 1246 both located in a secure environment 1242. The application may operate by sending a first part of the message 1234 to the wired device 1 1244 and the second part of the message 1236 to wired device 2 1246. The message may still be split between two devices to include a first portion of the message 1238 at a first device and a second portion of the message 1240 at the second device even though the recipient is considered to be in a secure environment. This permits increased security of the delivery of the message, as the entire message is not delivered to a single device of the recipient, but split between two devices and in a manner that makes the information of the message hard to comprehend if only one of the split messages was illegally obtained by an unauthorized party.

Figure 7:
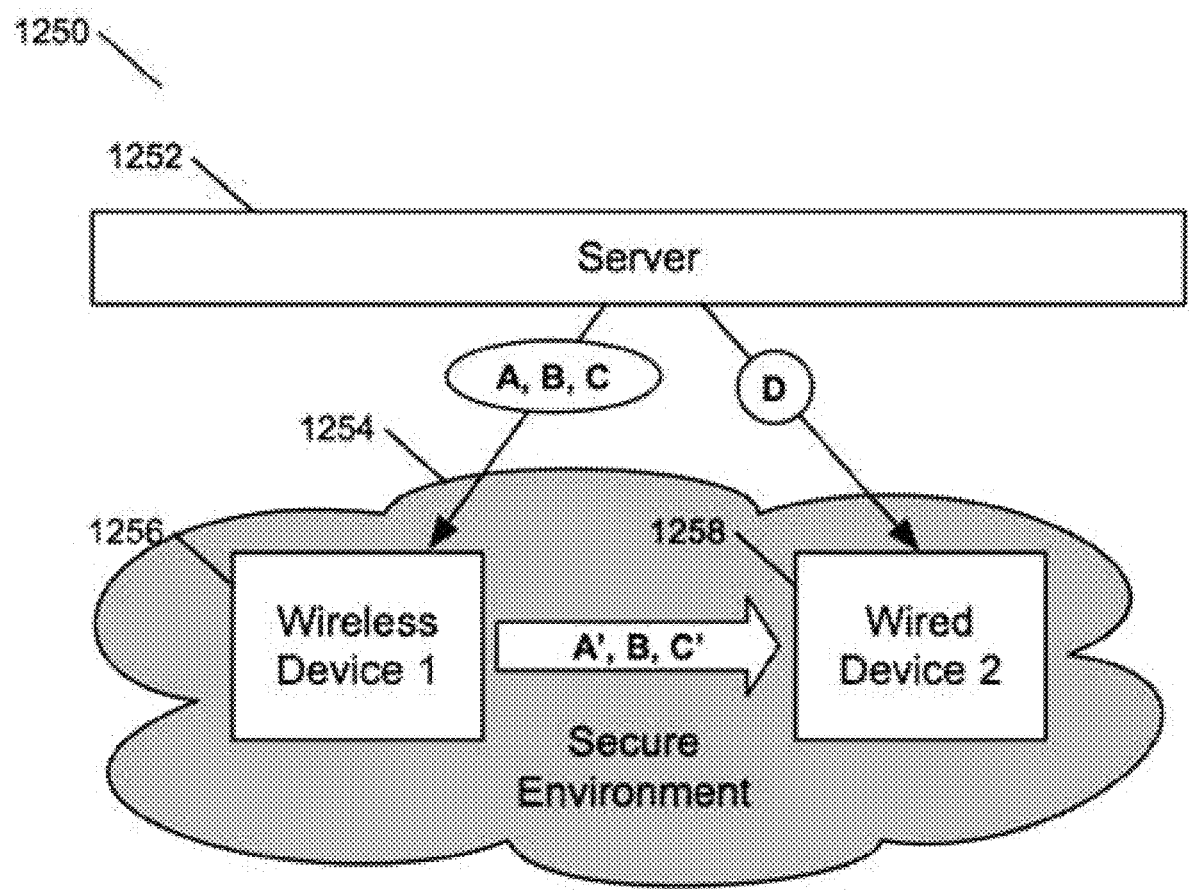
FIG. 7 illustrates an example of synchronizing altered data according to an example embodiment of the present application.

FIG. 7 illustrates one implementation of the current application where data is sent to the recipient's two or more devices within a secure environment then synchronized on the most secure device within the environment 1250. Referring to FIG. 7, a server 1252 sends data to two devices in a secure environment 1254. Message parts A, B and C are sent to a wireless device 1 1256, and wired device 2 1258. To encourage security, the parts of the message (A, B, C and D) are part of one message, with part D being the most sensitive data in the message. In this example, the recipient of the data has both devices 1256 and 1258 within some degree of access, or otherwise normally utilizes such devices. Evidence of utilization may be obtained by the application via a recent login (i.e., last 48 hours, recent GPS coordinate location updates, etc.) As a result, the user is notified that an incoming message is received on the wireless device and the notification also displays that the message is not entirely received, by a symbol or short statement indicator, and that a portion of the message has been sent to another device or may be located at a different device at a later time.

The most secure data in the message being delivered to device 1258 also contains a notification identifying that the entire message is not delivered and the remaining part of the message has been delivered to a different device than the first portion of the message. The user may interact with the wireless device 1256, altering the data utilizing GUI components, as noted as A' and C'.

This alerting process includes a notification window, such as a popup window on the user's device 1256, 1258 where a window is displayed on the device, over any other content currently on the device. This popup window contains text describing the situation where the received message is not entirely received, and that a portion of the message, perhaps the most secure portion of the message, for example, has been delivered to another, normally utilized device. The popup window also may contain additional interface components, such as buttons and icons where the user may utilize a pointing device, such as a finger, to cancel the window, or obtain further information for example.

On example alteration to the original message content may include the modification of text in the data A, B, C, as received at the wireless device 1256. Although the entire message may not be received at device 1256, the current application permits for the modification of the data as received at the device 1256. This provides a way to initiate composing a response to the message without yet having access to the entire message, for example.

In this example, the wireless device 1256 has altered the data sent to the other wireless device 1258. A synchronization occurs where all data in the original message is sent to the most secure device in the system, which in this example is wired device 2 1258. In this scenario, the altered data (A' and C') is sent to the wired device along with unaltered data 'B'.

In another example, the altered messages (A' and C') are sent to the wired device 1258 from a non-secure environment 1202. Splitting a message among devices may also include the application dividing a message among multiple devices if and only if the multiple devices are within close proximity to each other. By sending the data to multiple devices, the security of the delivery, if the message is higher as an outsider hacking into a device, will include only receiving partial data and thus the hacker will not be able to understand the data or receive the sensitive portions of the data.

A number of devices, for example two devices, may be determined to be in close proximity to each other by the system of the current application. In one example, the geographic location of a device, for example a wired device, may be determined via location-based services (LBS) executing in the operating system of the device, or an application executing on the device or an IP address lookup operation. In another example, the current application provides a list of devices associated with the user, for example, mobile, wired devices, wearable computers and/or devices normally in proximity to the user, for example, work peers, friends of the user, smart glasses, smart watches, smart shoes, etc., via a dropdown component so the user is able use a pointing device, for example, a finger or otherwise input via a keyboard device to select a device that is currently in proximity to the device.

In another example, the data presented on a device is removed once the reader has read the data. This is accomplished by the use of an optical tracker so the device is able to track the eye movements of the reader and determine when a line of the data has been consumed, for example, text that has been read. Once the application determines that the data has been consumed, it is deleted from the device, permitting yet another level of security in the dissemination of secure data to a recipient.

Figure 8:
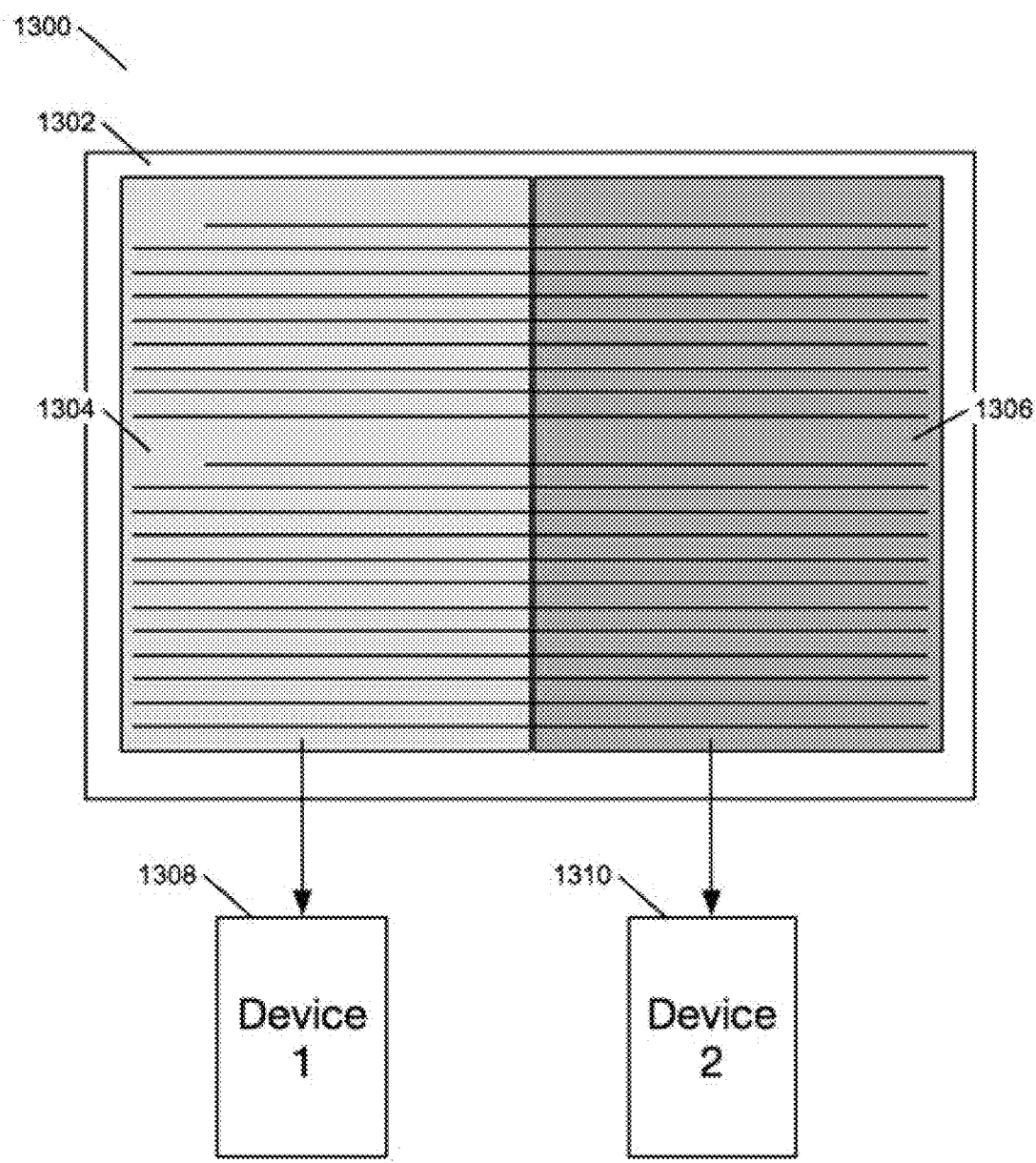
FIG. 8 illustrates an example of splitting data delivery to multiple devices according to an example embodiment of the present application.

In another example, FIG. 8 illustrates another implementation of the current application where data delivery is split between two devices 1300. In this example, a document 1302 stored at a server, for example, rules server 108, is split into two parts 1304 and 1306. The delivery of the first part 1304 is sent to device 1 1308, and the delivery of the second part 1306 is delivered to device 2 1310. In this example, an image of the document is captured at the rules server 108 and split in the middle. This process may be accomplished by using software that can convert a document into an image using a 'PDFDocument' class. Such an example code provides:

```
import java.awt.image.BufferedImage;
import java.io.File;
import java.io.IOException;
import java.util.List;
import javax.imageio.ImageIO;
import org.apache.pdfbox.pdmodel.PDDocument;
import org.apache.pdfbox.pdmodel.PDPage;
public class PDFUtil {
  public static void saveFirstPageThumbnail( ) throws
    IOException {
    PDDocument document=PDDocument.load("C:\\test-
      book.pdf");
    List<PDPage>       pages=document.getDocument
      Catalog( ).getAllPages( );
    PDPage page=pages.get(0); //first one
    BufferedImage       bufferedImage=page.convertTo
      Image( );
    File outputFile=new File("C:\\image.jpg");
    ImageIO.write(bufferedImage, "jpg", outputFile);
    }
}
```

In one example, once a document is available at the Rules Server 108, it is possible to create an image via the PDPage class method 'convertToImage( )'. This image is saved to a new file, in the example, the file is called 'image.jpg', which is written to a file entitled 'outputFile'. This file may then be divided in half and each portion delivered to different recipients.

In another example, each portion of the data 1304 and 1306 is sent to separate devices one line at a time. In this example, the document is not converted to an image, but each line is split into different parts 1304 and 1306, and each line is individually sent to the devices 1308 and 1310, one line at a time. The user may then read part of a line on one device, and then the rest of the line on the other device.

In yet another example, audio is split at the rules server 108 and sent to different devices. This may be accomplished via the server splitting up the audio according to determined intervals and sending each audio section to different devices. For example, the first 5 seconds is sent to device 1, the next 5 seconds is sent to device 2, the next 5 seconds is sent to device 1, and so forth.

Figure 9:
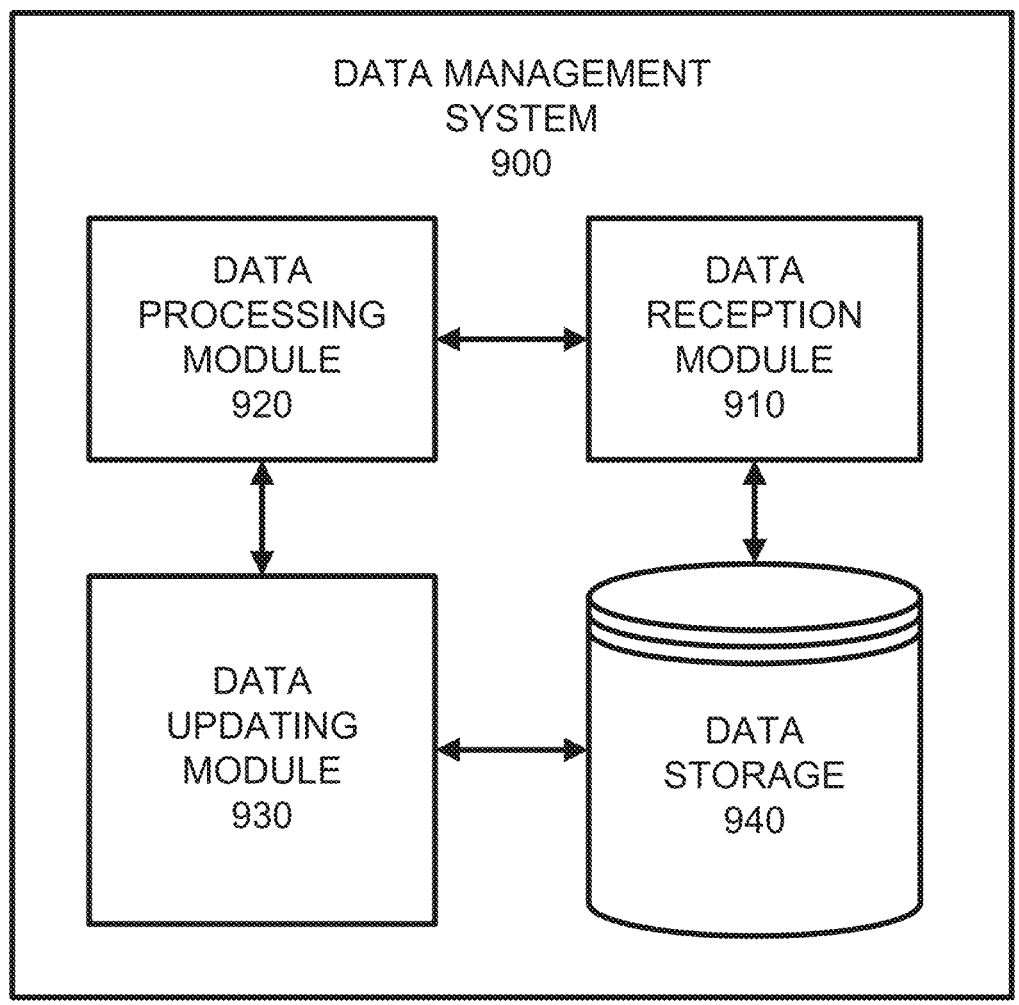
FIG. 9 illustrates a system configuration configured to perform one or more of the example embodiments of the present application.

FIG. 9 illustrates a message management system 900 according to example embodiments. Referring to FIG. 9, the message management system 900 may represent a stand-alone computer, a group of computers on a network, in the cloud or in communication via any medium known to one skilled in the art which operate to perform the various operations, procedures, methods and related functions of the present application and the software application described throughout the disclosure. Referring to FIG. 9, the message reception module 910 may be a transmitter/receiver that receives messages or the message portions and stores the message data in memory 940 and forwards the message content for processing to a processing module 920. The updated content may be identified and stored in memory via the message update module 930.

One example method of operation may include identifying message content associated with a message via the reception module 910, splitting the message content into a plurality of message content sections via the processing module 920, which also performs identifying a plurality of potential recipient devices, and transmitting the plurality of message content sections to the plurality of potential recipient devices via the update module 930. In one example, the method also includes identifying the plurality of potential recipient devices comprises identifying the plurality of potential recipient devices associated with a recipient identified by the message content.

Additionally, the plurality of potential recipient devices are operating in a non-secure network during the transmitting of the plurality of message content sections. The splitting of the message content into a plurality of message content sections further includes creating a first message with a message subject, a second message with sender information and recipient information, and at least one additional message with body text content and at least one file attachment. Transmitting the plurality of message content sections to the plurality of potential recipient devices further includes transmitting the first message to a first wireless device, transmitting the second message to a second wireless device and transmitting the at least one additional message to a non-wireless device. The method may also include determining a degree of sensitivity associated with the message content portions based on content of each of the message content portions, assigning a degree of sensitivity to each of the message content portions, and transmitting the message content portion with a highest degree of sensitivity to one of the potential recipient devices with the least vulnerability. The vulnerability is determined based on a comparison of communication mediums used by each of the plurality of potential recipient devices.

In another example method of operation, the method may provide identifying data content associated with a data file, splitting the data content into a plurality of data content sections, identifying a plurality of potential recipient devices, and transmitting the plurality of data content sections to the plurality of potential recipient devices. In this example, the method may also include identifying the plurality of potential recipient devices comprises identifying the plurality of potential recipient devices associated with a recipient.

Additionally, the method may provide splitting the data content by splitting an image of the data content into a plurality of sub-images and transmitting the plurality of sub-images to the respective plurality of potential recipient devices. Also, the method may provide converting the data file to an image file, and splitting the image file into a plurality of sub-image files. The splitting the data content into a plurality of data content sections includes copying one or more lines of content from the data file and transmitting the one or more lines to a first of the plurality of potential recipient devices and copying one or more additional lines of content from the data file and transmitting the one or more additional lines to at least one additional of the plurality of potential recipient devices. The method may also include splitting the data content into a plurality of data content sections comprises copying a predetermined time interval of content from the data file and transmitting the predetermined time interval of content to a first of the plurality of potential recipient devices and copying at least one additional predetermined time interval of content from the data file and transmitting the at least one additional predetermined time interval of content to at least one additional of the plurality of potential recipient devices. The plurality of potential recipient devices may share a same user profile.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 10 illustrates an example network element 1000, which may represent any of the above-described network components, etc.

Figure 10:
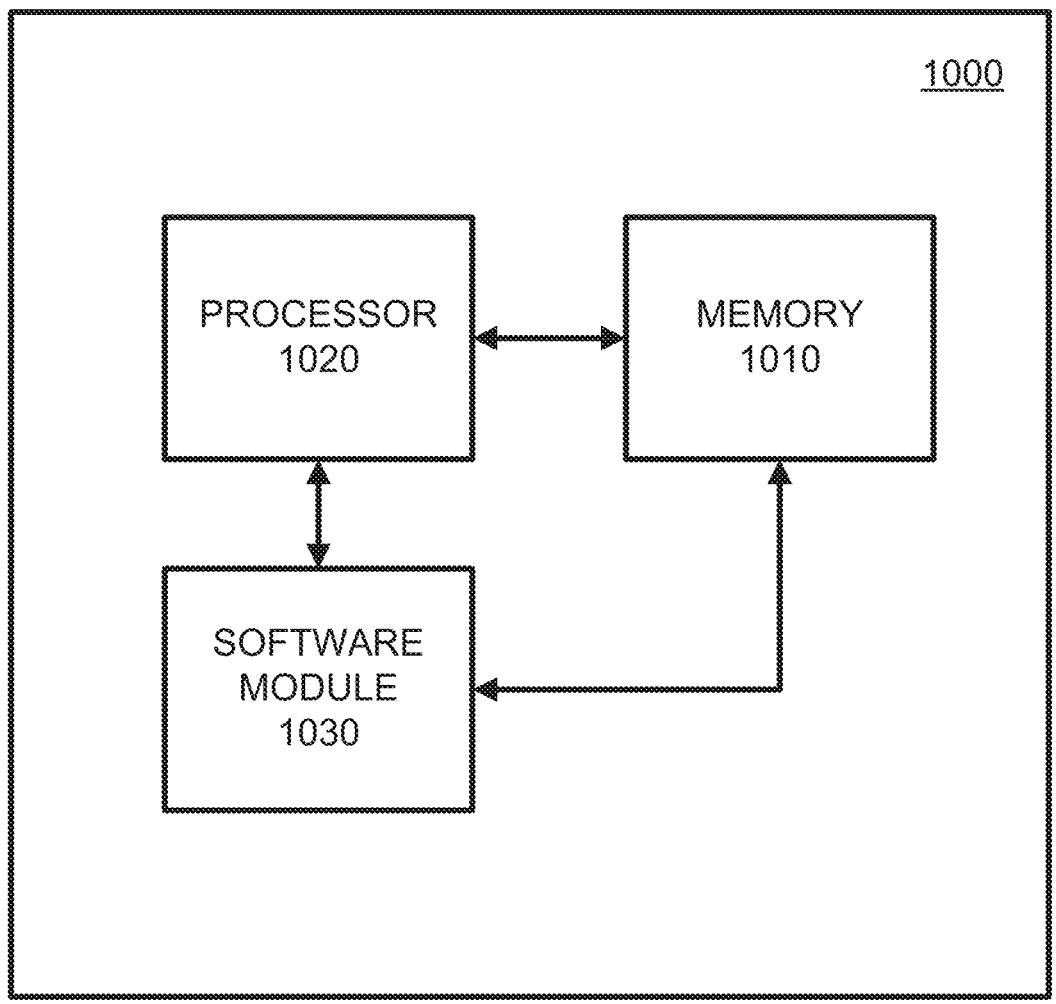
FIG. 10 illustrates an example network entity device configured to store instructions, software, and corresponding hardware for executing the same, according to example embodiments of the present application.

As illustrated in FIG. 10, a memory 1010 and a processor 1020 may be discrete components of the network entity 1000 that are used to execute an application or set of operations. The application may be coded in software in a computer language understood by the processor 1020, and stored in a computer readable medium, such as, the memory 1010. The computer readable medium may be a non-transitory computer readable medium that includes tangible hardware components in addition to software stored in memory. Furthermore, a software module 1030 may be another discrete entity that is part of the network entity 1000, and which contains software instructions that may be executed by the processor 1020. In addition to the above noted components of the network entity 1000, the network entity 1000 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 15 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   identifying data content associated with a data file;
   splitting the data content into a plurality of data content sections, further determining a degree of sensitivity associated with each of the data content sections based on a message content of each such section;
   identifying a plurality of potential recipient devices; and
   transmitting the plurality of data content sections to the plurality of potential recipient devices, wherein the message content portion with the highest degree of sensitivity is transmitted to the potential recipient device with the least vulnerability, the vulnerability being determined based on a comparison of communication mediums used by each of the plurality of potential recipient devices.

2. The method of claim 1, wherein identifying the plurality of potential recipient devices comprises identifying the plurality of potential recipient devices associated with a recipient.

3. The method of claim 1, wherein splitting the data content comprises splitting an image of the data content into a plurality of sub-images and transmitting the plurality of sub-images to the respective plurality of potential recipient devices.

4. The method of claim 1, further comprising:
   converting the data file to an image file; and
   splitting the image file into a plurality of sub-image files.

5. The method of claim 1, wherein splitting the data content into a plurality of data content sections comprises copying one or more lines of content from the data file and transmitting the one or more lines to a first of the plurality of potential recipient devices and copying one or more additional lines of content from the data file and transmitting the one or more additional lines to at least one additional of the plurality of potential recipient devices.

6. The method of claim 1, wherein splitting the data content into a plurality of data content sections comprises copying a predetermined time interval of content from the data file and transmitting the predetermined time interval of content to a first of the plurality of potential recipient devices and copying at least one additional predetermined time interval of content from the data file and transmitting the at least one additional predetermined time interval of content to at least one additional of the plurality of potential recipient devices.

7. The method of claim 1, wherein the plurality of potential recipient devices share a same user profile.

8. An apparatus, comprising:
   a processor configured to:
   identify data content associated with a data file;
   split the data content into a plurality of data content sections further determining a degree of sensitivity associated with each of the data content sections based on a message content of each such section;
   identify a plurality of potential recipient devices; and
   a transmitter configured to transmit the plurality of data content sections to the plurality of potential recipient devices, wherein the message content portion with the highest degree of sensitivity is transmitted to the potential recipient device with the least vulnerability, the vulnerability being determined based on a comparison of communication mediums used by each of the plurality of potential recipient devices.

9. The apparatus of claim 8, wherein the processor is further configured to identify the plurality of potential recipient devices by being configured to identify the plurality of potential recipient devices associated with a recipient.

10. The apparatus of claim 8, wherein splitting the data content further comprises the processing being configured to split an image of the data content into a plurality of sub-images and the transmitter is further configured to transmit the plurality of sub-images to the respective plurality of potential recipient devices.

11. The apparatus of claim 8, wherein the processor is further configured to convert the data file to an image file, and split the image file into a plurality of sub-image files.

12. The apparatus of claim 8, wherein splitting the data content into a plurality of data content sections comprises the processor being further configured to:
    copy one or more lines of content from the data file; and
    transmit the one or more lines to a first of the plurality of potential recipient devices;
    copy one or more additional lines of content from the data file; and
    transmit the one or more additional lines to at least one additional of the plurality of potential recipient devices.

13. The apparatus of claim 8, wherein splitting the data content into a plurality of data content sections further comprises the processor being configured to:
    copy a predetermined time interval of content from the data file;
    transmit the predetermined time interval of content to a first of the plurality of potential recipient devices;
    copy at least one additional predetermined time interval of content from the data file;
    transmit the at least one additional predetermined time interval of content to at least one additional of the plurality of potential recipient devices.

14. The apparatus of claim 8, wherein the plurality of potential recipient devices share a same user profile.

15. A non-transitory computer readable storage medium configured to store instructions that when executed cause a processor to perform:
- identifying data content associated with a data file;
- splitting the data content into a plurality of data content sections further determining a degree of sensitivity associated with each of the data content sections based on a message content of each such section;
- identifying a plurality of potential recipient devices; and
- transmitting the plurality of data content sections to the plurality of potential recipient devices, wherein the message content portion with the highest degree of sensitivity is transmitted to the potential recipient device with the least vulnerability, the vulnerability being determined based on a comparison of communication mediums used by each of the plurality of potential recipient devices.

16. The non-transitory computer readable storage medium of claim 15, wherein identifying the plurality of potential recipient devices comprises identifying the plurality of potential recipient devices associated with a recipient.

17. The non-transitory computer readable storage medium of claim 15, wherein splitting the data content comprises splitting an image of the data content into a plurality of sub-images and transmitting the plurality of sub-images to the respective plurality of potential recipient devices.

18. The non-transitory computer readable storage medium of claim 15, wherein the processor is further configured to perform:
- converting the data file to an image file; and
- splitting the image file into a plurality of sub-image files.

19. The non-transitory computer readable storage medium of claim 15, wherein splitting the data content into a plurality of data content sections comprises copying one or more lines of content from the data file and transmitting the one or more lines to a first of the plurality of potential recipient devices and copying one or more additional lines of content from the data file and transmitting the one or more additional lines to at least one additional of the plurality of potential recipient devices.

20. The non-transitory computer readable storage medium of claim 15, wherein splitting the data content into a plurality of data content sections comprises copying a predetermined time interval of content from the data file and transmitting the predetermined time interval of content to a first of the plurality of potential recipient devices and copying at least one additional predetermined time interval of content from the data file and transmitting the at least one additional predetermined time interval of content to at least one additional of the plurality of potential recipient devices.

* * * * *